United States Patent [19]
Zanoni

[11] 3,847,485
[45] Nov. 12, 1974

[54] OPTICAL NONCONTACTING SURFACE SENSOR FOR MEASURING DISTANCE AND ANGLE OF A TEST SURFACE

[75] Inventor: Carl Z. Zanoni, Middletown, Conn.
[73] Assignee: Zygo Corporation, Middlefield, Conn.
[22] Filed: Aug. 27, 1973
[21] Appl. No.: 391,783

Related U.S. Application Data
[63] Continuation-in-part of Ser. No. 256,693, May 25, 1972, Pat. No. 3,768,910.

[52] U.S. Cl. .................... 356/167, 356/5, 356/118, 356/125, 356/152, 250/234
[51] Int. Cl. .......................................... G01b 11/00
[58] Field of Search .......... 356/4, 5, 118, 123, 125, 356/152, 167; 250/234, 235

[56] References Cited
UNITED STATES PATENTS
3,692,414  9/1972  Hosterman et al. ................ 356/167
3,768,910  10/1973  Zanoni .............................. 356/167

Primary Examiner—Ronald L. Wibert
Assistant Examiner—Paul K. Godwin
Attorney, Agent, or Firm—Milton Zucker

[57] ABSTRACT

An optical sensor is described for providing an output responsive to the position and normality of a test surface with respect to a predetermined plane. A beam of radiant energy is focused by a lens onto the test surface, while being modulated along its optical axis by a first mirror oscillating at one frequency and being modulated transverse to its optical axis by a second mirror at a second frequency. The first harmonic of the frequency of the modulation of the first mirror is then monitored as to phase and amplitude by a single photodetector to provide a measure of the direction and distance of the test surface from the determined plane. The sum or difference harmonic of the radiant energy reflected from the test surface is also monitored as to phase and amplitude by the same photodetector to provide a measurement of the normality of the test surface with respect to the determined plane.

6 Claims, 7 Drawing Figures

4(a) TEST SURFACE IN FRONT OF $F_o$

4(b) TEST SURFACE BEHIND $F_o$

FOCAL POINT $F_o$

OPTICAL NONCONTACTING SURFACE SENSOR FOR MEASURING DISTANCE AND ANGLE OF A TEST SURFACE

RELATED APPLICATIONS

This application is a continuation-in-part of my application Ser. No. 256,693, filed May 25, 1972, now U.S. Pat. No. 3,768,910.

BACKGROUND OF THE INVENTION

1. Field of the Invention

The present invention relates to apparatus for accurate measurement on a point-to-point basis of the distance of a test surface from a predetermined reference plane, together with a direct measurement of its angle of inclination. More particularly, the invention relates to optical apparatus for this type of measurement, of either specularly reflecting or diffusely reflecting surfaces.

2. The Prior Art

For the accurate measurement of soft, delicate, hot, or moving surfaces, noncontacting sensors must be used. Prior-art devices of this character include capacitive gauges, eddy-current gauges, air gauges, spot interferometers and optical sensors. The nonoptical sensors cannot work at distances of more than a small fraction of an inch without loss of sensitivity.

Optical sensors have advantages due to the nature of light itself. The principal advantages are:
(1) They do not require direct mechanical contact between the sensor and the object to be measured; (2) the surface over which the measurement is done can be very small — in some cases, only several square microns; (3) the distance from the sensor to the object to be measured can be large; (4) the response time is limited to that of the photodetector and its electronics; and (5) light variations are directly convertible to electrical signals.

Prior-art optical sensors employ various techniques, such as parallax, time elapse, triangulation, trilateration, autofocusing, stadimetry, and interferometry.

In the prior art of autofocusing optical noncontact sensors, the distance from the focal point was determined by one of two methods. Firstly, by effectively placing two photodetectors on the optical axis such that one is on one side of the focus and the other photodetector on the other side of the focus, the inequality of the photodetector outputs is proportional to the offset of the point centered between the detectors and the focal point. Furthermore, the sign of the difference indicates on which side of the focus the point centered between the detectors is located. When the photodetectors provide zero difference, the coincidence of the focus and the point centered between the two photodetectors is signified. However, since the difference in the output of the photodetectors is dependent on the gain of the system, the distance scale is dependent on the amount of light received by the photodetectors. Thus, distance measurements become sensitive to the constancy of the light-source output and the reflectivity of the test surface. In order to overcome these difficulties, some compensation can be effected by using an average of the two photodetector outputs to correct the distance scale.

Another method used to ascertain the distance of a test surface from the focal point is to monitor the amplitude and phase of the reflected rays with respect to their crossing or not crossing the optical axis.

In my copending application Ser. No. 256,693, filed May 25, 1972, I have disclosed and claimed an optical measuring device comprising a source of radiant energy (most preferably light from a laser) which is focused onto a reflecting surface whose position is to be measured with respect to a predetermined reference plane, means, most preferably an oscillating mirror, for modulating the radiant energy at a desired frequency along its optical axis, means for collecting the radiant energy reflected from the test surface onto a single photodetector, and means for monitoring the first harmonic of said reflected radiant energy to obtain information with respect to the direction and amplitude of the distance between the test surface and the reference plane.

That application also describes a device for determining the angle of the plane of the test surface in which a second modulating means, oscillating at a different frequency from the first modulating means, and laterally offset from the first means, is used to determine the distance of a laterally offset portion of the test surface from the reference plant so that the angle of the plane can be calculated from the two distances and the offset. Unfortunately, this method of determining angle, while practical in the laboratory, presents difficulties in commercial operation and requires expensive optics. A satisfactory controllable offsetting of the two beams requires a very fast, expensive lens, and absolute maintenance of optical alignment, which is difficult to maintain under casual commercial conditions. Moreover, it is necessary to perform a calculation to get the desired information as to angle.

OBJECTS OF THE PRESENT INVENTION

This invention aims to provide an optical sensing device of the sort described in my said application Ser. No. 256,693, which directly measures the angle of the test plane as well as its distance from the reference plane without the need for calculation with inexpensive optics which do not require absolute maintenance of alignment, so that the device can be used under ordinary commercial conditions.

STATEMENT OF THE INVENTION

In accordance with the instant invention, I provide a source of radiant energy (most preferably light from a laser) which is focused onto a reflecting surface whose position is to be measured with respect to a predetermined reference plane, means, most preferably a transversely oscillating first mirror, for modulating the radiant energy at a desired frequency along its optical axis, means, most preferably a rotationally oscillating second mirror, for modulating the radiant energy at a different, second frequency perpendicular to the optical axis, means for collecting the radiant energy reflected from the test surface onto a single photodetector, means for monitoring first harmonics of said collected radiant energy at the frequency of modulation of the first mirror to obtain information with respect to the direction and amplitude of the distance between the test surface and the reference plane, and means for monitoring one or both of the side-band frequencies of said reflected radiant energy to obtain primary information with respect to the normality, both in magnitude and direction, of the test surface relative to the reference plane.

THE DRAWINGS

Figure 4:
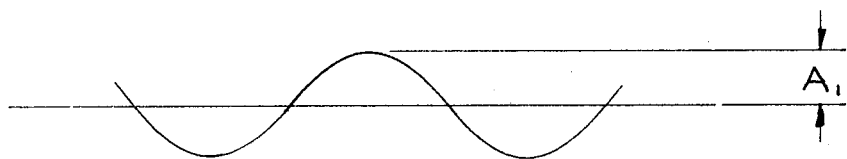
Figure 4:
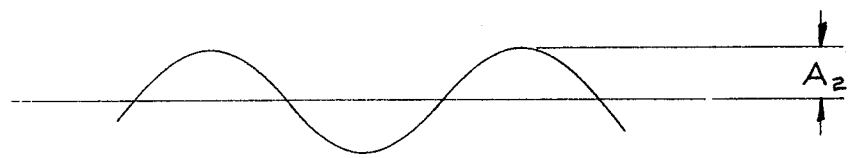
Figure 5:
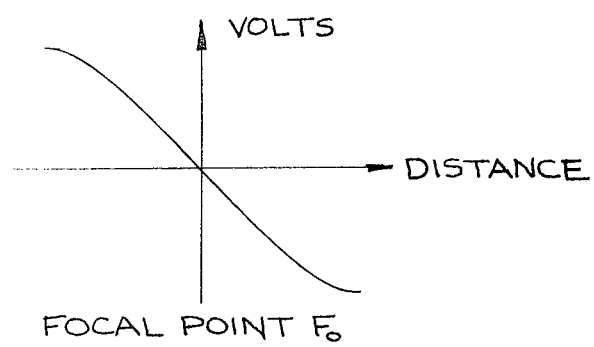
Figure 3:
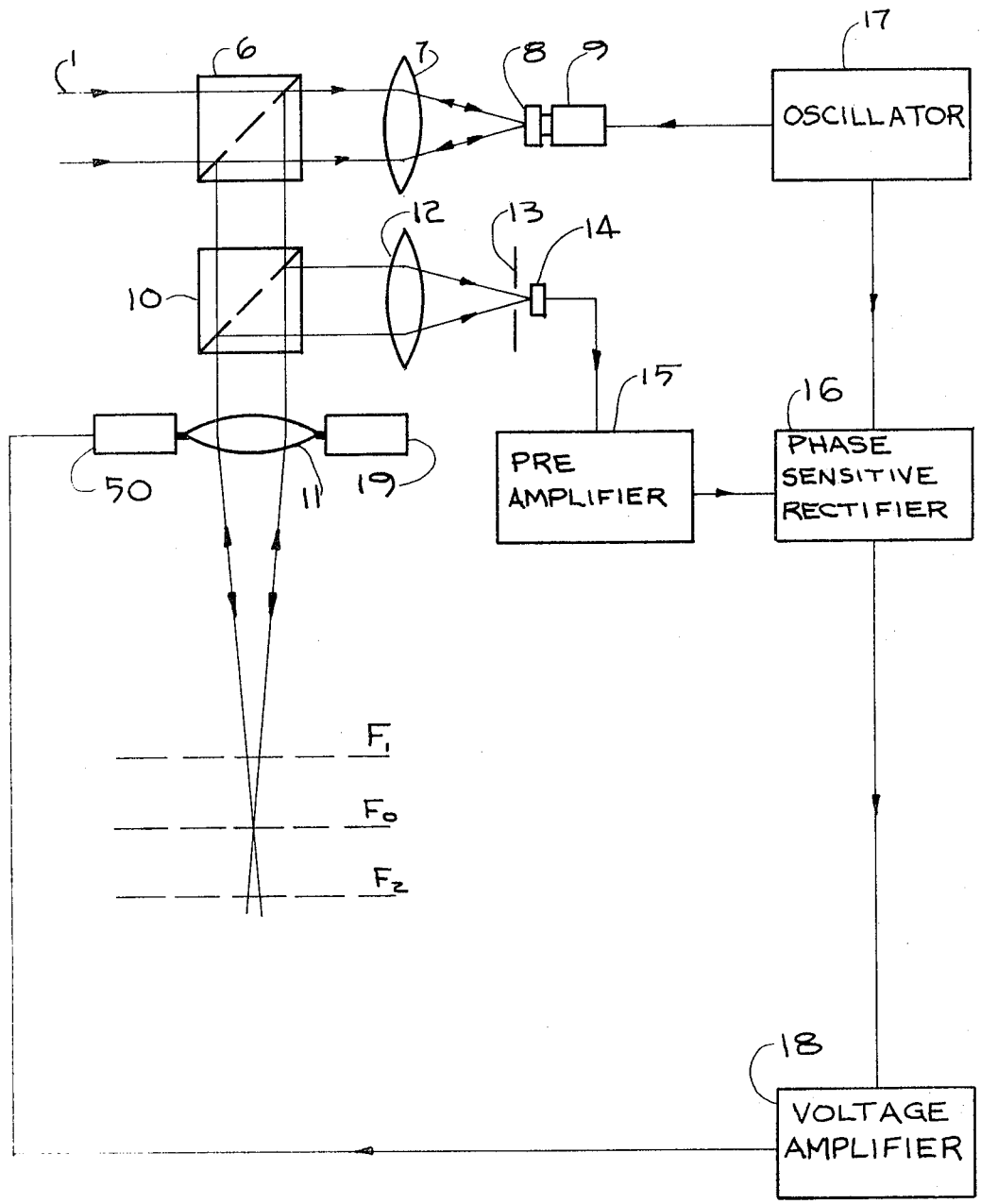
FIG. 3 is a schematic block diagram of an optical measuring apparatus of a preferred embodiment of the invention.

FIGS. 4 (a) and (b) and FIG. 5 are graphs illustrating aspects of the operation of the apparatus in FIG. 3.

Figure 6:
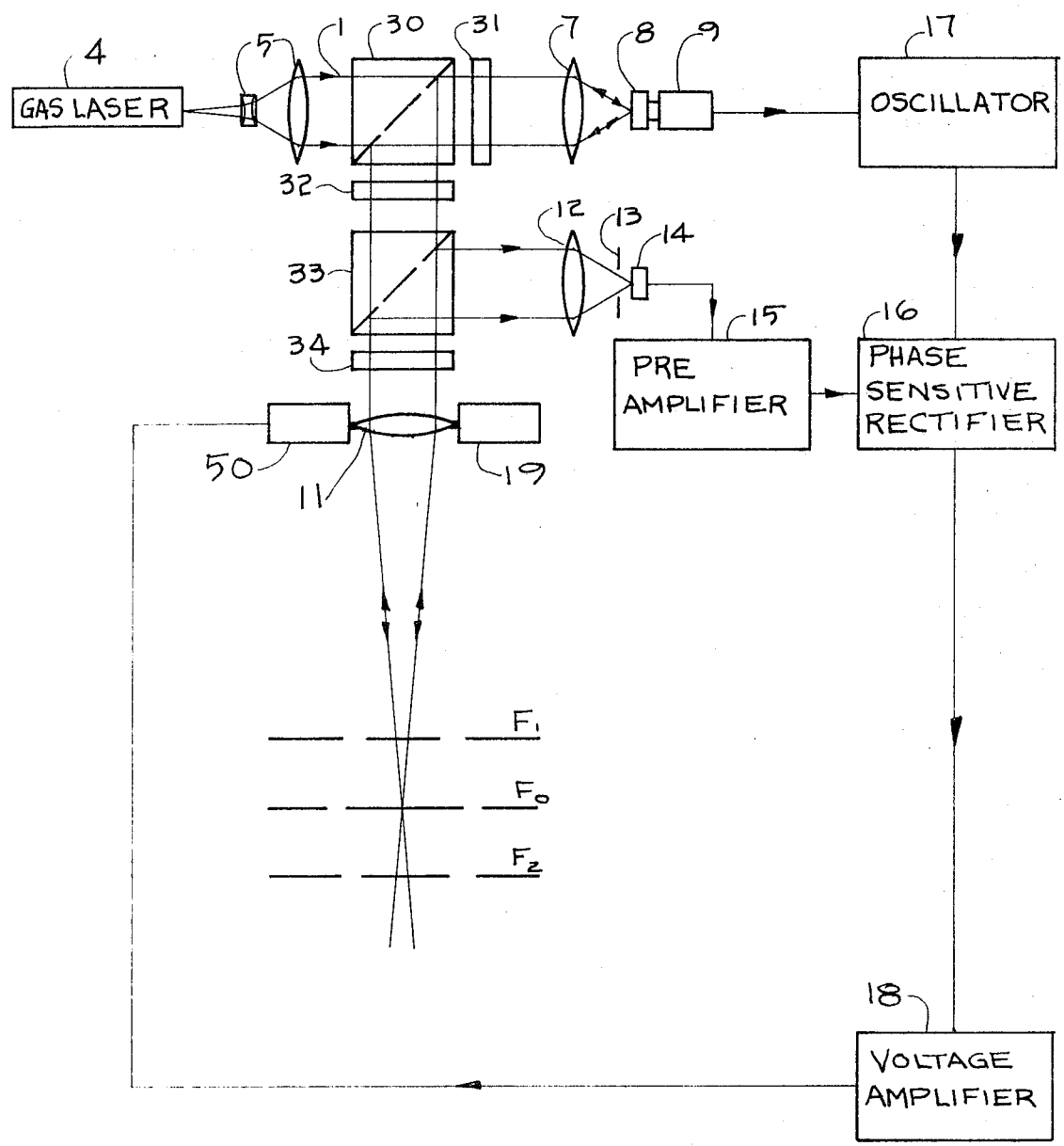

FIG. 6 is a schematic diagram illustrating a preferred system which utilizes the polarized light from a laser in a most efficient manner.

Figure 7:
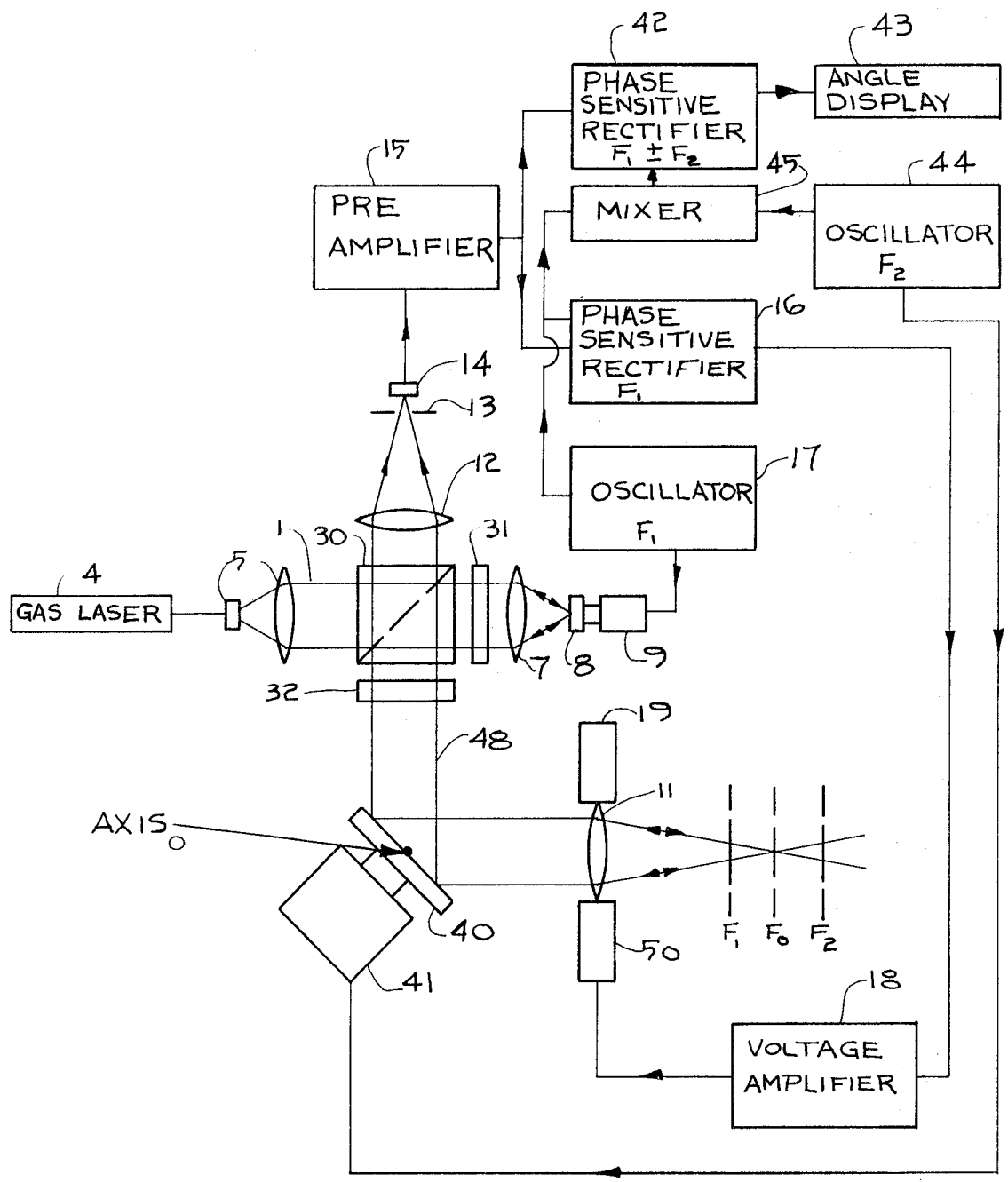

FIG. 7 is a schematic diagram illustrating the optical system which represents the instant invention.

DETAILED DESCRIPTION OF THE INVENTION

Figure 1:
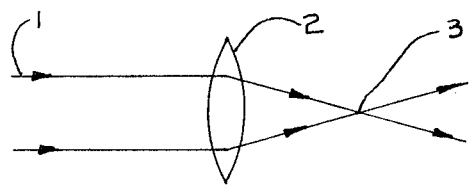
FIG. 1 is a schematic of a lens focusing a collimated light beam.

Description and Explanation of the Schematic in FIG. 1

While the apparatus has application for a wide range of radiation sources, the following description is taken by way of example with respect to an optical measuring system. The term "radiant energy" as used herein includes, but is not limited to, electromagnetic energy of all frequency ranges.

A light source such as tungsten bulb, xenon bulb, light-emitting diode, laser diode, or other source of radiant energy, and most preferably a gas laser, provides optical energy for the collimated beam 1 in FIG. 1. A lens 2 suitably corrected to minimize aberrations will bring the radiant energy to focus 3. For the case where the radiant energy is nearly monochromatic, the spot diameter at the focal point of the lens is given by $$\text{spot diameter} = 4\lambda f/(\pi d)$$

where $\lambda$ is the wavelength of the light, $f$ is the focal length of the lens, and $d$ is the diameter of the collimated beam of radiant energy. Since $(f/d) = f/no.$ of the lens, the above equation can be rewritten as $$\text{spot diameter} = (4\lambda/\pi)(f/no.)$$

Thus, the relation establishes the fact that the spot diameter achievable with optical means can be as small as several wavelengths with a suitably fast lens.

Figure 2:
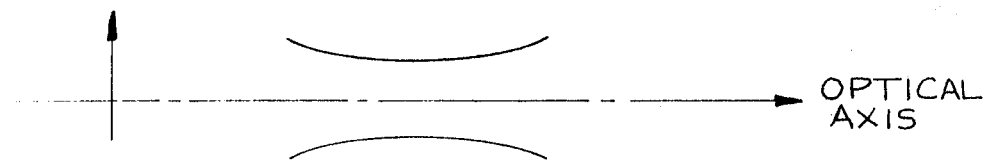
FIG. 2 is a schematic of an exploded view of the light at the focal point.

Description and Explanation of the Schematic in FIG. 2

FIG. 2 shows schematically a highly magnified view of the light distribution on the optical axis at the focal point for an incident collimated light beam.

The point at which the light intensity is 20 percent of that at the focal point is denoted as the depth of focus. Quantitatively, the depth of focus is given by $$\text{depth of focus} = \lambda(f/no.)^2$$

where $\lambda$ is the wavelength of the radiant energy and $f/no.$ is the ratio of the focal length divided by the diameter of the incident light beam. Thus, referring to FIG. 2, the principle underlying the operation of the invention will be given.

In the present invention, the focus of a beam of radiant energy oscillates back and forth along the optical axis at some frequency $f_o$. By monitoring the first harmonic of the radiant energy reflected from a test surface which is near the focus, one obtains information relative to the phase and offset of the test surface and the center of oscillation of the focal point. By modulating the focal point by an amount nominally equal to the depth of focus, the first harmonic of the reflected radiant energy is proportional to the first derivative of the curve given in FIG. 2. Thus, there is zero first harmonic when the center of oscillation coincides with the focal point. As the center of oscillation departs from the test surface, the amplitude of the first harmonic of the reflected radiant energy is proportional to the displacement, and the phase depends on the direction of the displacement. By moving the focus of the radiant energy by one means or another so that the focus always coincides with the test surface, the position and motion of the test surface can be ascertained. Furthermore, by servoing the focus of the radiant energy using negative feedback based on an error signal derived from the amplitude and phase of the first harmonic of the radiant energy reflected by the test surface, the distance measurement is extremely insensitive to variations in the output of the light source as well as to variations in the reflectivity of the test surfaces. Additionally, the measurement does not require that the test surface be normal to be incident light. Moreover, since the signal is contained in the light modulated at a frequency $f_o$, the sensor is insensitive to ambient light changes. In addition, only one photodetector is required to measure the radiant energy reflected by the test surface. The above features accrue, since the detecting scheme uses the first spatial derivative of the shape of the light distribution at the focus of the radiant energy.

Description and Explanation of the Optical System in FIG. 3

Referring to FIG. 3, there is here illustrated in detail an optical system useful in an embodiment of the invention.

A part of a collimated beam of radiant energy 1 passes through a beam splitter cube 6. The transmitted beam is focused by lens 7 onto the front surface first mirror 8. First mirror 8 is placed at the focal point of lens 7. The radiant energy reflected by this mirror is re-collimated by lens 7. A part of the radiant energy collimated by lens 7 is reflected by the beam splitter 6 such that the collimated beam enters the second beam splitter 10. A part of the radiant energy is transmitted by the beam splitter so that the collimated beam is focused by lens 11. Placing a test surface near the focus $F_o$ of lens 11 will cause a reflected beam of radiant energy to re-enter lens 11. The beam splitter 10 and lens 12 direct a part of the radiant energy reflected by a surface near $F_o$ onto the photodetector 14. An aperture 13 is placed in front of the photodetector.

$F_1$ denotes a plane in front of the focus $F_o$, $F_2$ denotes a plane behind the focus $F_o$.

The first mirror 8 is attached to a mechanical oscillator 9 such as a piezoelectric transducer, a motor-driven fixture, or other device. Mirror 8 oscillates along its normal at a fixed frequency.

The oscillation of mirror 8 causes the focal point of the radiant energy focused by lens 11 to oscillate along the optical axis of lens 11. The ratio of the amplitude of oscillation of the focal point at $F_o$ to the amplitude of oscillation of mirror 8 is related by the square of the ratio of the focal length of lens 11 to the focal length of lens 7. Thus, the oscillation at $F_o$ is equal to $(f_{11}/f_7)^2$ x oscillation of mirror 8. The optical magnification or, in some cases, demagnification effected by this embodiment is an extremely crucial auxiliary feature facilitating the implementation of both very-high-accuracy sensors and large dynamic-range sensors. Since the technique measures the radiant energy reflected by the test surface passing through an aperture 13, only one photodetector 14 is required.

The axial position of lens 11 is determined by the position of transducer 50 (such as a piezoelectric transducer, a servo-motor, or other device). This axial position of lens 11 is continuously servoed so that the light remains in focus on the test surface, and this axial position is measured by the measurement apparatus 19. This is essential in order to get proper decoupling of the distance and angle measurements.

Description and Explanation of FIGS. 4 (a) and (b) and FIG. 5

FIG. 4 (a) shows schematically the first harmonic output of the photodetector when the test surface is in front of $F_0$. The amplitude $A_1$ is proportional to the displacement of the center of oscillation from the test surface. FIG. 4 (b) shows the phase reversal that occurs when the test surface is displaced behind $F_0$. The amplitude $A_2$ is proportional to the magnitude of the displacement.

FIG. 5 depicts the D.C. voltage resulting if the output of the photodetector 14 is synchronously demodulated with a phase-sensitive rectifier and the rectifier signal is passed through a low-pass filter. The distance axis denotes the distance between the test surface and the center of oscillation of the focus. When the test surface is coincident with the center of oscillation, there is zero D.C. output. When the test surface is in front of or behind the center of oscillation, a D.C. voltage whose magnitude is proportional to the offset and whose sign depends on the direction of the offset is produced by the phase-sensitive rectifier.

Referring back to FIG. 3, a preamplifier 15 provides voltage amplication and impedance matching of the electrical output of the photodetector 14. The phase-sensitive rectifier 16 synchronously demodulates the output of the preamplifier 15. The output of the reference oscillator 17 is used to drive the phase-sensitive rectifier 16 as well as to provide the oscillation for the mirror 8 through the transducer 9. The voltage amplifier 18 applies the D.C. output of the phase-sensitive rectifier 16 to the transducer 50 which then moves the lens 11 in accordance with the voltages applied to it. The measurement apparatus 19 indicates the position of lens 11. This distance is directly related to the position of the test surface.

Description and Explanation of FIG. 6

FIG. 6 shows a schematic of the optical system and a block diagram of the electrical apparatus of a preferred embodiment of the invention which is highly efficient as to energy use. The output beam of a gas laser 4 is expanded and collimated by the beam expander 5. The beam 1 enters the polarization beam splitter 30. A quarter-wave phase retardation plate 31 is located between the beam splitter 30 and lens 7. The reason for using a polarization beam splitter in conjunction with the quarter-wave phase retardation plate is to provide minimum loss of radiant energy at the beam splitter. This configuration increases the light throughput efficiency by about a factor of four over a conventional 50—50 beam splitter for a linearly polarized incident beam 1. The retardation plate 31 has its optic axis oriented at 45° with respect to the direction of polarization of the incident light. The linearly polarized light incident on 31 is thusly converted to circularly polarized light.

Upon reflection at mirror 8, the handedness of the circular polarization is changed. Thus, upon passing back through the phase retardation plate 31, the polarization of the reflected light is rotated by a total of 90° so that all the light which was transmitted by the polarization beam splitter 30 will now be reflected. A half-wave phase retardation plate 32 is placed between the beam splitter 30 and a beam splitter 33; it rotates the plane of polarization of the light by 90° so that all the light is transmitted by the polarization beam splitter 33.

The quater-wave retardation plate 34 placed between the beam splitter 33 and the lens 11 functions similarly to plate 31, and enables all the light, including that reflected from the test object, to be passed through the lens 11 to the photodetector 14. Thus, except for accidental losses due to scattering and absorption, the light fed into the instrument from the laser 4 is available at the photodetector 14.

As in FIG. 3, the preamplifier 15 provides voltage amplification and impedance matching of the electrical output of the photodetector 14. The phase-sensitive rectifier 16 synchronously demodulates the output of the preamplifier 15. The output of the reference oscillator 17 is used to drive the phase-sensitive rectifire 16 as well as to provide the oscillation for the mirror 8 through the transducer 9. The voltage amplifier 18 applies the signal from phase-sensitive rectifier 16 to the transducer 50 which then moves lens 11 in accordance with the voltages applied to it. The measurement apparatus 19 indicates the position of lens 11. This distance is directly related to the position of the test surface.

FIGS. 1 to 6 illustrate the basics of the present invention, as described in my copending application Ser. No. 256,693, somewhat modified to allow for the direct determination of the angle of the test surface.

Description and Explanation of FIG. 7

FIG. 7 shows a schematic of the optical system and a block diagram of the electrical apparatus of a preferred embodiment of the instant invention, which is highly efficient as to energy use. The output beam of a gas laser 4 is expanded and collimated by the beam expander 5. The beam 1 enters the polarization beam splitter 30. A quarter-wave phase retardation plate 31 is located between the beam splitter 30 and lens 7. The retardation plate 31 has its optic axis oriented at 45° with respect to the direction of polarization of the incident light. The linearly polarized light incident on 31 is thusly converted to circularly polarized light.

Upon reflection at first mirror 8, the handedness of the circular polarization is changed. Thus, upon passing back through the phase retardation plate 31, the polarization of the reflected light is rotated by a total of 90° so that all the light which was transmitted by the polarization beam splitter 30 will now be reflected.

The quarter-wave phase retardation plate 32 functions similarly to retardation plate 31. The collimated outgoing beam 48 is then reflected by a second mirror 40. The light reflected by mirror 40 is then focused by lens 11 onto the test surface. An angular dither is impressed upon mirror 40 by the transducer 41. The transducer 41 can be any of a variety of electromechanical devices, e.g., a piezoceramic device, a galvonometric scanner, or an acousto-optic scanner. The axis of rotation coincides with the reflective surface of second mirror 40. In FIG. 7, the axis of rotation is normal to the plane of the figure. The angular dither of second mirror 40 causes the light focused by lens 11 to oscillate in a direction orthogonal to its optic axis. The light reflected by the test surface is collected by lens 11, reflected by second mirror 40, transmitted by the beamsplitter 30 and focused onto the photodetector 14 by lens 12.

If $f_1$ and $f_2$ denote the frequency of oscillation of mirrors 8 and 40, respectively, then, in general, the output of the preamplifier 15 will contain harmonics of $f_1$, $f_2$, $f_1 + f_2$ and $f_1 - f_2$, i.e., the fundamental modulation frequencies plus the sideband. The amplitude and phase of the $f_1$ harmonic contains the primary measurement data on the distance of the test surface from a predetermined plane.

As in FIG. 6, the preamplifier 15 provides voltage amplification and impedance matching of the electrical output of the photodetector 14. The output of the preamplifier is fed into two phase sensitive rectifiers, 42 and 16. Phase sensitive rectifier 16 synchronously demodulates the $f_1$ component of the output of preamplifier 15. Phase sensitive rectifier 42 synchronously demodulates either the $f_1 + f_2$ or the $f_1 - f_2$ component of the output of preamplifier 15. The output of the reference oscillator 17 is used to drive the phase-sensitive rectifier 16 as well as to provide the oscillation for the first mirror 8 through the transducer 9. The voltage amplifier 18 applies the output of the phase-sensitive rectifier 16 to the transducer 50 which then moves lens 11 in accordance with the voltages applied to it. The measurement apparatus 19 indicates the position of lens 11. This distance is directly related to the position of the test surface.

The output of the reference oscillator 44 is used to provide the angular oscillation of second mirror 40 through the transducer 41. The output reference oscillators 17 and 44 are applied to the input of a mixer 45 which generates the reference side-band frequency for phase-sensitive rectifier 42. The output of phase-sensitive rectifier 42 is directly proportional to the component of the angle between the normal of the test surface and the optical axis of lens 11 in the plane of oscillation of the focus of lens 11.

While the drawings illustrate the feeding of the signals from the photodetector into measurement apparatus, it is obvious that they could be fed into servo mechanisms which could maintain the angle of the test surface at the focal position, so that the device could be used, say, as a control for a cutting operation, or for any other mechanical operation on the object of the focal point.

The specific embodiments of the invention herein disclosed may obviously be modified without departing from the scope of the invention as defined in the claims.

I claim:

1. An optical noncontacting surface sensor for measuring the distance and angle of a reflecting test surface and a predetermined reference plane comprising (A) a source of radiant energy; (B) means for focusing at least a portion of said radiant energy on the reflecting surface; (C) means for modulating said focusing of said portion of said radiant energy at one desired frequency along its optical path; and (D) means for modulating said focusing of said portion of said radiant energy at a second desired frequency perpendicular to the optical path; (E) means for collecting radiant energy reflected from the test surface onto a single photodetector; (F) means for monitoring the first harmonic of said collected radiant energy at the frequency of modulation of means (C), to obtain information with regard to the direction and amplitude of the distance between the test surface and the reference plane; (G) and means for monitoring one or both of the side-band frequencies of said reflected energy to obtain primary information with respect to the normality, both in magnitude and direction, of the test surface relative to the reference plane.

2. The apparatus of claim 1, in which the modulating means (C) is a mirror which oscillates along the optical axis about the focus of the energy delivered to it.

3. The apparatus of claim 1, in which the energy source is a laser.

4. The apparatus of claim 1, in which the energy source is a gas laser which emits polarized light which is directed into a beam expander which expands the light into a collimated beam, the collimated beam passes into a first polarization beam splitter which delivers a portion of the light through a quarter-wave retardation plate into a first lens which focuses the now circularly polarized light onto an oscillating mirror which serves both to modulate the light along its optical axis at a desired frequency and to change the handedness of the light so that the polarization of the reflected light is rotated by a total of 90°, so that all of the light incident on the beam splitter is delivered, through a half-wave phase retardation plate, to a second polarization beam splitter which directs a portion of the light through a second lens onto a photodetector, and a portion of the light through a second quarter-wave phase retardation plate through a third lens onto the test surface, and the light reflected from the test surface to the photodetector, so that substantially all of the light from the laser, minus accidental losses, is delivered to the photodetector.

5. The apparatus of claim 1, in which said source of radiant energy (A) is a beam of collimated light; said means (B) for focusing said portion of radiant energy on the test surface comprises at least one beam splitter and a first lens; said means (C) for modulating the energy comprises a second lens which focuses a portion of the light from the beam splitter onto a first mirror which oscillates along the optical path of the light about the focal point of the energy delivered to it and reflects the light as a modulated beam back through the beam splitter to deliver a portion of the now modulated light from the first lens onto the test surface, and delivers a portion of the light reflected from the test surface through said means (B) for collecting the reflected light which is a third lens which focuses the light onto the single photodetector.

6. The apparatus of claim 5, in which the first lens is is controlled so that the test object is maintained at its focal point, and the desired measurements are obtained from the position of the first lens.

\* \* \* \* \*